(12) United States Patent
Chipper

(10) Patent No.: US 6,292,293 B1
(45) Date of Patent: *Sep. 18, 2001

(54) WIDE-ANGLE INFRARED LENS AND DETECTOR WITH INTERNAL APERTURE STOP AND ASSOCIATED METHOD

(75) Inventor: Robert B. Chipper, Allen, TX (US)

(73) Assignee: Raytheon Company, Lexington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,078

(22) Filed: Jun. 25, 1999

(51) Int. Cl.[7] ............................... G02B 1/00; G02B 5/18; G02B 5/32; G02B 13/14
(52) U.S. Cl. .......................... 359/356; 359/565; 359/19
(58) Field of Search .................................. 359/350, 354, 359/355, 356, 357, 504, 661, 753, 565, 16, 19

(56) References Cited

U.S. PATENT DOCUMENTS

| | | |
|---|---|---|
| 3,360,649 | 12/1967 | Brau et al. . |
| 4,542,954 * | 9/1985 | Stoltzmann ........................ 359/357 |
| 4,738,496 | 4/1988 | Canzek . |
| 5,051,591 | 9/1991 | Trotta et al. . |
| 5,251,063 * | 10/1993 | Baumann ............................. 359/355 |
| 5,386,315 * | 1/1995 | Amon et al. ........................ 359/350 |
| 5,479,292 | 12/1995 | Yoshikawa et al. . |
| 5,737,120 * | 4/1998 | Arriola ................................. 359/356 |
| 5,880,879 * | 3/1999 | Foo ..................................... 359/356 |
| 5,909,307 * | 6/1999 | Koyama ............................... 359/356 |

* cited by examiner

Primary Examiner—Jon Henry
(74) Attorney, Agent, or Firm—O'Keefe, Egan & Peterman, LLP; Rene'E. Grossman

(57) ABSTRACT

An infrared lens and detector system and associated method are disclosed that utilize infrared lenses to form an internal entrance pupil at which an internal aperture stop is placed to control the intensity of infrared radiation focused on the infrared detector. In more detailed respects, the infrared lens is an assembly including a first infrared lens, a second infrared lens spaced from the first lens to form a pupil between the first and second lenses, and an aperture stop disposed proximal the pupil. The aperture stop may have a fixed diameter or may have an aperture stop that is manually or automatically adjustable depending upon the intensity of the infrared radiation being viewed. Significantly, this lens assembly may be sealed for improved performance particularly in extreme conditions. In more detailed respects, the lens assembly forms a wide-angle lens and includes a diffractive surface on the second lens to reduce color aberrations and improve performance. In another respect, the infrared lens is part of a detector system that also includes an infrared detector, a signal processor, and a display.

25 Claims, 2 Drawing Sheets

US 6,292,293 B1

WIDE-ANGLE INFRARED LENS AND DETECTOR WITH INTERNAL APERTURE STOP AND ASSOCIATED METHOD

TECHNICAL FIELD OF THE INVENTION

The present invention relates to infrared imaging systems. More particularly, the present invention relates to a wide-angle infrared lens having an internal aperture stop.

BACKGROUND

Infrared imaging is the process of detecting infrared radiation and producing an image capable of being visualized by the human eye. A typical infrared imaging system includes a number of lenses, a chopper, an infrared detector, signal processing electronics, and a display.

One problem found with prior art infrared imaging systems relates to the intensity of the infrared radiation. This problem is particularly evident in wide-angle infrared imaging systems used in extreme environments. For example, in fire-fighting applications, the intensity of infrared radiation from very hot or burning objects is sometimes great enough that it saturates the infrared detector. It is, therefore, desirable to reduce the intensity of the infrared radiation when needed without adversely effecting image quality.

Prior wide-angle infrared imaging systems have used two to three Germanium (Ge) lenses and have used an external entrance pupil or aperture stop. One example of such a prior wide-angle system having an external entrance pupil is illustrated in U.S. Pat. No. 5,479,292 issued to Yoshikawa et al. In particular, such prior design have typically used an external entrance pupil or aperture stop with a negatively powered Ge lens follow by one or two positive powered Ge lenses. The use of external entrance pupils, however, is often undesirable, for example, in extreme conditions such as in fire-fighting applications. If the entrance pupil is external, the pupil cannot be sealed off without a significant increase in the size and cost of the infrared imaging system. Other prior designs that do not use external entrance pupils have made use of three or more optical elements. However, such designs typically have had poorly defined entrance pupils that are not adequate for the full processing range desired.

SUMMARY OF THE INVENTION

In accordance with the present invention, an infrared lens and detector system and associated method are disclosed that utilize infrared lenses to form an internal entrance pupil at which an internal aperture stop may be placed to control the intensity of infrared radiation focused on the infrared detector. The present invention thereby allows for size, cost and performance advantageous that have not previously been attained.

In a first embodiment, the present invention is an infrared lens assembly including a first infrared lens, a second infrared lens spaced from the first lens to form a pupil between the first and second lenses, and an aperture stop disposed proximal the pupil. In more detailed respects, the present invention may form a wide-angle lens having a view angle of about thirty degrees or greater and may include only two lenses. In addition, the lenses may be aspheric, and the surface of the second lens facing the pupil may be covered with a diffractive surface to reduce color aberrations.

In further respects, the aperture stop may have a fixed diameter or may have an adjustable diameter. In particular, the range for the adjustable diameter may provide for stops from about F/1 to F/10. Still further, the aperture stop may be manually or automatically adjustable depending upon an intensity of the infrared radiation coming from the received image. The lens assembly may also be sealed allowing for better performance in extreme environmental conditions.

In another embodiment, the present invention is an infrared lens detector system including an infrared detector, a first and second lenses disposed in front of the infrared detector such that the second lens being spaced from the first lens to form a pupil between the first and second lenses and to focus infrared radiation onto the infrared detector, and an aperture stop positioned between the first and second lenses at the pupil. In addition, the detector system may further include a signal processor coupled to the infrared detector and a display coupled to the signal processor. The detector system may also be sealed. In one particular aspect, the detector system is operable for a fire-fighting application.

In yet another respect, the present invention is a method for controlling an intensity of infrared radiation passing through an infrared lens including providing a first and second lenses, positioning the first and second lenses to form a pupil between the first and second lenses and to focus infrared radiation passing through the first and second lenses, and controlling the intensity of the infrared radiation passing through the first and second lenses by positioning an aperture stop proximate the pupil. In addition, the method may further include detecting the infrared radiation passing through the first and second lenses. Further, the method may include processing the detected infrared radiation and displaying an image resulting from the processing infrared radiation. Still further, the method may include adjusting the diameter of the aperture stop to modify the amount of infrared energy passing through the first and second lenses and this adjusting step may include automatically adjusting the diameter of the aperture stop depending upon an intensity of the infrared radiation.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an improved infrared lens and detector system that utilizes two or more infrared lenses to form an internal entrance pupil where an internal aperture stop or iris may be placed to control the intensity of infrared radiation focused on an infrared detector. over the full operational range. The present invention thereby advantageously allows for uniform control of the intensity of infrared radiation over the full operating range of the aperture stop or iris without degrading the image quality. In addition, the present invention allows the lens assembly to be sealed for extreme conditions or environments, such as fire-fighting applications, without a need for additional parts.

Figure 1:
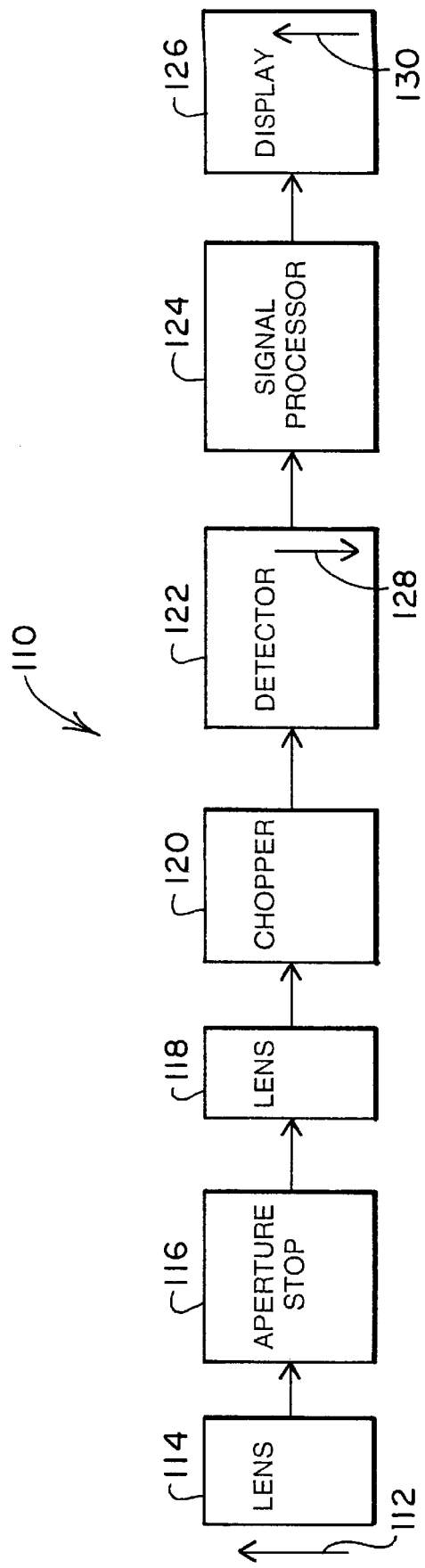
FIG. 1 is a block diagram of an infrared imaging system according to the present invention.

FIG. 1 is a block diagram of an infrared detector system 110 including lenses 114 and 118, an aperture stop 116, a chopper 120, an infrared detector 122, a signal processor 124, and a display 126. A source of infrared radiation is illustrated in FIG. 1 as a source scene 112. Infrared radiation from the source scene 112 passes through the first lens 114, through the aperture stop or iris 116, and through the second lens 118. It is noted that lenses 114 and 118 may each be a single lens or may include two or more lenses, as desired for a particular application. It is also noted that the chopper 120, the infrared detector 122, the signal processor 124 and the display 126 may be implemented with standard components. The present invention is directed to using the first and second lenses 114 and 118 to create an internal entrance pupil so that the aperture stop or iris 116 may be placed between the first and second lenses 114 and 118.

So that the source scene 112 may be detected, the lenses 114 and 118 are axially spaced from one another such that the infrared radiation from the source scene 112 is focused onto the infrared detector 122. The shape, placement, and materials for the lenses 114 and 118 are selected such that an entrance pupil is formed between the lenses 114 and 118. The aperture stop 116 (i.e., an iris) is placed between the lenses 114 and 118 where the pupil is formed. The function of the aperture stop 116 is to control the intensity of the infrared radiation directed toward the infrared detector 122. Significantly, the aperture stop or iris 116 is internal to the infrared imaging system 110.

The chopper 120 is disposed between the lens 118 and the detector 122. The function of the chopper 120 is to selectively scatter the radiation before it reaches the infrared detector 122. The scattered radiation detected by the infrared detector 122 is used to produce a reference signal representing the uniform average radiance of the source scene 112. The function of a chopper such as chopper 120 is described, for example, in U.S. Pat. No. 5,051,591 to Trotta et al.

Signals generated by the infrared detector 122 based on detected radiation are sent to the signal processor 124 where they are processed and sent to the display 126. The signal processor 124 can be an analog signal processor or a digital signal processor. The display 126 may be any type of viewing device, such as a cathode ray tube or an LCD display, for example. The resulting image 130 displayed on the display 126 is a visual image of the irradiance image 128 on the infrared detector 122 of the source scene 112.

Figure 2:
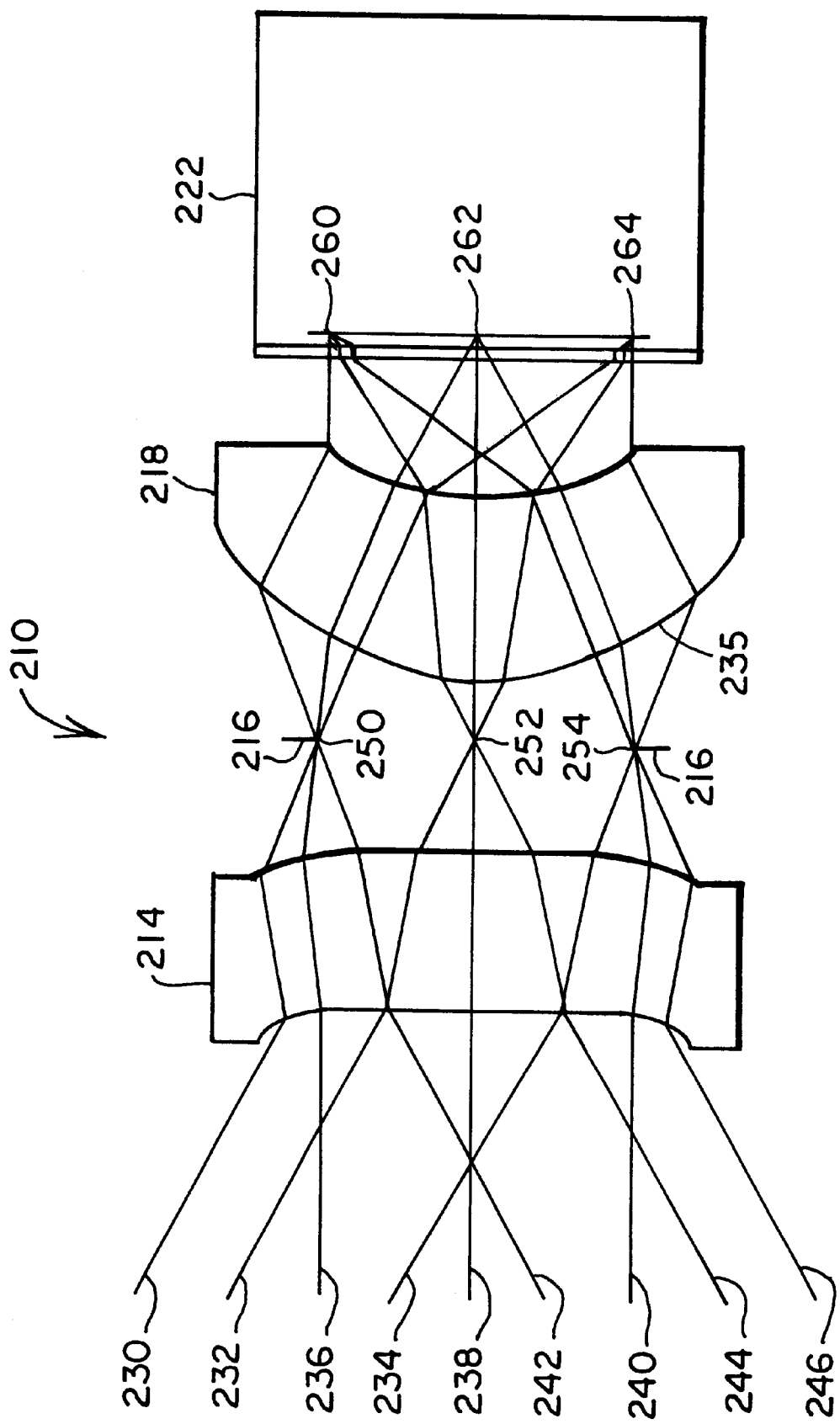
FIG. 2 is a diagram illustrating the optical layout of an infrared imaging system according to with the present invention.

FIG. 2 is a diagram of one embodiment of a portion 210 of an infrared imaging system 110 shown in FIG. 1. As depicted in FIG. 2, an aperture stop or iris 216 is placed between a first lens 214 and a second lens 218 where a pupil is formed. The pupil defines the F/number, as discussed further below, or the amount of infrared energy traveling between the lenses 214 and 218. The infrared detector 222 is also shown in FIG. 2, although for purposes of FIG. 2 the chopper 120, the signal processor 124, and the display 126 are not depicted. It is noted that the aperture stop or iris 216 may be a device with a circular interior surface. The diameter of this interior surface may also be adjustable so that the amount of energy that is allowed to pass through to the detector 222 may be controlled as desired.

FIG. 2 also shows example optical ray traces 230, 232, 234, 236, 238, 240, 242, 244 and 246 that represent the light passing through the lenses 214 and 218. As depicted, ray traces 230, 232 and 234 are parallel to each other; ray traces 236, 238 and 240 are parallel to each other; and ray traces 242, 244 and 246 are parallel to each other. As depicted, the ray traces are focused by lens 218 to the an internal focal position where the internal aperture stop 216 is positioned. The ray traces are then focused by lens 218 onto the infrared detector 222. In particular, ray traces 230, 232 and 234 are ultimately focused to point 264; ray traces 236, 238 and 240 are ultimately focused to point 262; and ray traces 242, 244 and 246 are ultimately focused to point 260.

The lenses 214 and 218 may be positively powered lenses. Lens 214 may also be highly aspheric, for example, with up to 14th order terms or higher. The highly aspheric nature of lens 214 helps achieve a good image of the entrance pupil so that the iris 216 may be positioned at a suitable spot so that image uniformity is maintained over the full operating range of the iris 216. The lens 218 may also be highly aspheric, for example with up to 12th order terms or higher. Example lenses according to the present invention, as depicted in FIG. 2, are further described with respect to TABLE 1 and the associated equations set forth below.

TABLE 1

Example Lens and Lens Surface Specifications

| Parameter | Lens #1 | Lens #2 |
|---|---|---|
| Radii | | |
| R1 | 4.95375" | .71910" |
| R2 | 8.81718" | .95367" |
| Aspheric Coefficients | | |
| K for R1 | 0 | 0 |
| A for R1 | −.749055 | −.017981 |
| B for R1 | −1.59545 | .012252 |
| C for R1 | 2.36560 | .286370 |
| D for R1 | −16.4082 | −1.66940 |
| E for R1 | −2.19004 | 0 |
| F for R1 | −9.77063 | 0 |
| K for R2 | 0 | 0 |
| A for R2 | −1.06000 | 1.71210 |
| B for R2 | .0737484 | −.0948913 |
| C for R2 | 1.88091 | 59.30760 |
| D for R2 | −3.89137 | −444.3640 |
| E for R2 | .0322779 | 1286.2100 |
| F for R2 | 5.00938 | 0 |
| Diffractive Coefficients | | |
| C1 for R1 | 0 | .01688 |
| C2 for R1 | 0 | 0 |
| C3 for R1 | 0 | 0 |
| C1 for R2 | 0 | 0 |
| C2 for R2 | 0 | 0 |
| C3 for R2 | 0 | 0 |
| Thickness | .405" | .450" |
| Airspace | .274" (to Iris) | .148" (from Iris) |
| Material | Raytheon 1173 | Raytheon 1173 |

TABLE 1 above describes example lens and lens surface specifications for a first lens 214 and a second lens 218 according to the present invention. In particular, TABLE 1 provides for each lens the radii of the inner and outer surfaces, the aspheric coefficients, the diffractive coefficients, the thickness, the airspace, and the material type.

The following is the surface equation, including aspheric and diffractive terms, for example lenses according to the values in TABLE 1. The surface equation describes mathematically the surface of the lens once the proper coefficients are included. The first term identifies spheric properties. The second term identifies aspheric properties. And, the third term identifies diffractive or phase relief properties.

$$(1\text{st term}) \quad SAG(Z) = \frac{CC * Y^2}{1 + SQRT[1 - (1 + K) * CC^2 * Y^2]}$$

$$+A*Y^4+B*Y^6+C*Y^8+D*Y^{10}+E*Y^{12}+F*Y^{14} \quad (\text{2nd term})$$

$$\text{(3rd term)} \quad + HOR * \left\{ \frac{C1*Y^2 + C2*Y^4 + C3*Y^6}{N1-N2} - \frac{LAMBDA}{N1-N2} * INT\left[\frac{C1*Y^2 + C2*Y^4 + C3*Y^6}{LAMBDA}\right] \right\}$$

WHERE:
Z=Sag value along the optical axis CC=curvature (1/radius) K=conic constant A=$4^{th}$ order aspheric coefficient B=$6^{th}$ order aspheric coefficient C=$8^{th}$ order aspheric coefficient D=$10^{th}$ order aspheric coefficient E=$12^{th}$ order aspheric coefficient F=$14^{th}$ order aspheric coefficient N1=Material Index before surface N2=Material Index after the surface LAMBDA=Wavelength of operation Y=the height of the lens orthogonal to the Z direction HOR=Diffractive surface design order (typically −1 or ×1) C1=$2^{nd}$ order phase coefficient C2=$4^{th}$ order phase coefficient C3=$6^{th}$ order phase coefficient SQRT=square root function INT=integer function For color correction purposes, the lens 218 may also utilize a diffractive optical element (DOE) that is placed on the surface 235 of lens 218. This DOE corrects for color aberrations that may be caused by the high dispersion nature of the lens material. The DOE 235 reduces both lateral and axial color aberrations. The DOE 235 helps maximize modulation transfer function (MTF) performance to improve image quality. The MTF describes the modulation (transfer factor) of the image of a sinusoidal object as the frequency increases and is a measurement of the ability of an optical system to reproduce various levels of detail from the object to the image, as shown by the degree of contrast in the image.

A diffractive surface that produces a DOE 235 is a variation from an aspheric surface. A diffractive surface may be of a kinoform type produced by diamond point turning fabrication, patterned and etched or the like. Kinoforms are diffractive elements whose phase modulation is introduced by a surface relief pattern. The diffractive optical surface results in a step function whose surface is cut back by precisely one wavelength of light frequency of interest every time its thickness increases by that amount. The general equation for the diffractive surface is shown above with respect to the third term in the surface equation. Such diffractive surfaces are further discussed in U.S. Pat. No. 5,493,441 which is hereby incorporated by reference in it entirety.

Referring still to FIG. 2, the nature of the pupil is now discussed further. The intersections of the ray traces 230, 232, 234, 236, 238, 240, 242, 244 and 246 at points 250, 252 and 254 between the lenses 214 and 218 in FIG. 2 illustrate the location where the pupil is formed. By creating this internal pupil location according to the present invention, the aperture stop 216 may be internally positioned. It is preferred that the aperture stop be located at a pupil location so that changes to the size of the aperture stop will adjust the energy of the source scene 112 that passes to the detector 222 in uniform manner across the scene image. It is noted that the aperture stop 216 may be located near the pupil, but not exactly at the pupil, although the performance of the system would decline as the aperture stop 216 is moved farther from the pupil location.

The aperture stop or iris 216 may be implemented as a mechanical device designed to smoothly vary the diameter of the light bundle allowed to pass through the lens. Because the aperture stop 216 is positioned at the pupil as described above, a change in the diameter of the aperture stop 216 will uniformly vary the intensity of the radiation detected by the detector 222. In other words, as the lens is stopped down, the amount of energy to each pixel is decreased without creating any non-uniform shading across the display. The aperture stop 216 stops down the lens to reduce the intensity of the signal reaching the infrared detector 222. This will tend to prevent saturation of the infrared detector 222, for example by hot objects, while maintaining good image quality throughout the operating range of the iris. It is noted that if the aperture stop 216 were not located at a good quality pupil, a reduction in the diameter of the opening would cause non-uniform shading by decreasing the amount of energy reaching the corner pixels of the detector more than the amount of energy reaching the center pixels of the detector. This non-uniform shading, therefore, results in a non-uniform intensity level from the center to the edge of the detector array.

As mentioned above, the function of the aperture stop 216 is to stop down the lens thereby reducing the infrared energy passing to the detector 222 without losing resolution or introducing unwanted image artifacts. Thus, depending upon the energy of the source scene 112, the desired aperture stop size may be selected to allow an optimal or desired amount of energy to pass to the detector 222. This optimal or desired amount of energy may be selected by determining the operating dynamic range of the detector 222 and by attempting to maximize the use of this dynamic range. For example, the aperture stop 216 may includes stops from about F/1 to F/10, where F/n designates the lens speed. Lens speed is commonly represented as the ratio of the focal length to the diameter of the lens and the designation "n" represents this ratio. Lower speeds (e.g., F/1) produce brighter images. So, as the diameter of the aperture stop 216 is decreased, the lens speed increases (e.g., F/2, F/3, etc.). Therefore, if the intensity of the radiation detected by the imaging system 210 is great enough (e.g. from very hot objects), the aperture stop 216 can be adjusted, decreasing its diameter, thereby increasing the lens speed and reducing the amount of energy reaching the detector 222. This reduction of the radiation reaching the infrared detector 222 prevents saturation of the detector while maintaining satisfactory image quality. It is noted that the aperture stop 216 may be implemented as desired, and may be for example a manually adjusted aperture stop manipulated by a user or may be an automatic aperture stop controlled by the imaging system utilizing intensity sensors and appropriate processing. In addition, both a manual mode and an automatic mode of operation may be provided so that a user may select the mode of operation desired.

Because the aperture stop 216 according to the present invention may be located internally between the lenses 214 and 218 due to the internal pupil, the imaging system may be built as a compact, sealed device using minimal components. In contrast, prior imaging systems with external entrance pupils require that an aperture stop be located in front of lens 214 if image quality is to be maintained over the operating range of the aperture stop. Therefore, such a prior imaging system could not be sealed without adding significant size and additional components to enclose the aperture stop in front of the lens 214.

When the user of the imaging system 210 needs to view a source scene which is relatively dark, or which is obstructed by smoke, for example, the user will aim the imaging system toward the source scene. The lenses 214 and 218 are shaped and positioned to direct infrared radiation from the source scene onto the infrared detector 222. Of course, the focus of the lenses can be adjusted in a conventional manner in order to obtain a sharp image. The ray traces shown in FIG. 2 illustrate how the infrared radiation is focused onto the infrared detector 222.

If the infrared radiation from the source scene is relatively intense, such as radiation from very hot or burning objects, the aperture stop 216 can be adjusted to stop down the lenses. As mentioned above, the intensity of the infrared radiation from the source scene 112 may be determined automatically by the imaging system or by the user from simply observing the displayed image on the display of the imaging system. It is again noted that the adjustment of the aperture stop 216 may be performed manually by the user or automatically by the imaging system. Since the aperture stop 216 is located at the pupil, when the diameter of the aperture stop 216 is reduced, the intensity of the radiation is uniformly reduced, resulting in a detected image having no shadows. If the aperture stop 216 were not adjusted, the high intensity infrared radiation may saturate the sensors on the infrared detector 222. When the infrared radiation from the source scene becomes less intense, the aperture stop 216 can be adjusted again, allowing more radiation to the detector 222.

Although other lenses may have an apparent pupil (aperture) stop location within the lens itself, the quality of the image of this pupil is typically unacceptable and inappropriate to function with an iris without adversely affecting the performance of the lens throughout the iris operating range. What will happen with a an iris operating at a poorly defined pupil is that the uniformity on the display will change throughout the iris operating range creating the appearance of unwanted image artifacts that are distracting and degrade the quality of the image presented to the user. These distortions result from the fact that the energy reaching the detector near the edge of the detector array will be more greatly reduced as compared to the energy reaching the center of the array, hence creating a non-uniform shading of the display.

One major advantage of the infrared imaging system of the present invention is the ability to locate the iris or aperture stop between the lenses rather than in front of the lenses. For applications where a sealed imaging system is desired, for example in fire-fighting applications, the entire imaging system 210 can be sealed with the aperture stop 216 positioned between the lenses 214 and 218. Therefore, the imaging system of the present invention can be made with smaller and with fewer components, reducing the cost of the imaging system. With an exterior pupil, an iris would create a situation where moving parts would be exposed to the environment, undesirable for certain applications. To overcome this, an exterior window could be added to shield/seal the iris from the environment, but this will add parts, increases cost and complexity.

In addition, the present invention is particularly useful for wide-angle lens applications, such as those having a relatively wide viewing angle, roughly in the range of about thirty degrees and greater. It is noted, however, that the present invention may be applied to lenses having more narrow viewing angles. Still further, the present invention allows for the use of only two lenses, whereas prior implementations often required many more lenses.

The lenses used with the present invention may be made from a chalcogenide glass. One suitable type of chalcogenide glass is manufactured by Raytheon by the designation 1173. A similar glass by the designation Amtir-3 is also available from Amourphous Materials, Inc., of Garland, Texas. Material of this type is also discussed in U.S. Pat. No. 3,360,649, which is hereby incorporated by reference in its entirety. TABLE 2 below provides material properties for example infrared material.

TABLE 2

| | Glass Properties | | | |
|---|---|---|---|---|
| | Index | | Abbe V-Number | |
| Glass | 10μ | 4μ | 8–12μ | 3–5μ |
| Raytheon 1173 | 2.604 | 2.622 | 108 | 169 |
| Amtir-3 | 2.602 | 2.621 | 110 | 174 |
| Ge | 4.003 | 4.025 | 991 | 102 |
| ZnSe | 2.406 | 2.433 | 57 | 178 |
| GaAs | 3.278 | 3.307 | 108 | 146 |
| ZnS | 2.198 | 2.250 | 23 | 113 |

As shown above in TABLE 2, the Raytheon 1173 material has a relatively low index of refraction of about 2.6 in the far-infrared waveband or lower. Lenses made from this chalcogenide glass also have very high dispersion relative to Ge lenses resulting in the desirability of a color correcting diffractive surface for surface 235 in FIG. 2, as described above. The dispersion of a material indicates its ability to bring all wavelengths of interest to a common focus. Specifically, dispersion is the rate of change of index with respect to wavelength. V-Number, which is indicated in TABLE 2, represents a measure of the reciprocal dispersion so that a higher V-Number indicates a lower dispersion and vise-versa. Ge lenses typically do not require additional surface structures that further reduce the color aberration because their dispersion is very low in the 8–12 micron wave band. The lenses may also be made from other materials having low index of refraction, for example, such as those listed in TABLE 2 above. Depending upon the material used and its optical properties, changes would likely be made in the shape, thickness and diffractive structures for the resulting lenses, and image quality may vary. Chalcogenide glass is advantageous because of its low thermal rate of expansion, low thermal rate of index change, lower cost relative to Germanium (Ge) and for its manufacturability using high volume, low cost fabrication processes.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A wide-angle infrared lens assembly, comprising:
   a lens system having only two lenses, a first infrared aspheric lens and a second infrared aspheric lens, the second lens being spaced from the first lens to form a pupil between the first and second lenses and the second lens having a diffractive surface; and
   an aperture stop disposed proximal the pupil;
   wherein the first and second lenses together form a wide-angle lens having a view angle of about thirty degrees or greater.

2. The infrared lens assembly of claim 1, wherein the first and second lenses are made from a material having an index of refraction of about 2.6.

3. The infrared lens assembly of claim 1, wherein the first and second lenses are made from chalcogenide glass.

4. The infrared lens assembly of claim 1, wherein the first lens has up to 14th order terms or higher and the second lens has up to 12th order terms of higher.

5. The infrared lens assembly of claim 1, wherein the aperture stop has a fixed diameter.

6. The infrared lens assembly of claim 1, wherein the aperture stop has an adjustable diameter.

7. The infrared lens assembly of claim 6, wherein the range for the adjustable diameter provides for stops from about F/1 to F/10.

8. The infrared lens assembly of claim 6, wherein the aperture stop is automatically adjustable depending upon an intensity of a received image.

9. The infrared lens assembly of claim 1, wherein the assembly is sealed.

10. An infrared lens detector system, comprising:

an infrared detector;

a lens system having only two lenses disposed in front of the infrared detector, a first infrared aspheric lens and a second infrared aspheric lens, the second lens being spaced from the first lens to form a pupil between the first and second lenses, the second lens having a diffractive surface, and the second lens being spaced from the first lens to focus infrared radiation onto the infrared detector; and an aperture stop disposed proximal the pupil;

wherein the first and second lenses together form a wide-angle lens having a view angle of about thirty degrees or greater.

11. The infrared lens detector system of claim 10, further comprising a signal processor coupled to the infrared detector and a display coupled to the signal processor.

12. The infrared lens detector system of claim 11, wherein an the detector system is operable for a fire-fighting application.

13. The infrared lens detector system of claim 12, wherein the first and second lenses together form a wide-angle lens having a view angle of about thirty degrees or greater.

14. The infrared lens detector system of claim 13, wherein the first and second lenses are made from a material having an index of refraction of about 2.6.

15. The infrared lens detector system of claim 13, wherein the aperture stop has an adjustable diameter.

16. The infrared lens detector system of claim 15, wherein the aperture stop is automatically adjustable depending upon an intensity of a received image.

17. The infrared lens detector system of claim 16, wherein the detector system is sealed.

18. A method for controlling an intensity of infrared radiation passing through a wide-angle infrared lens, comprising:

providing a lens system having only two lenses, a first and second infrared aspheric lenses, the second lens having a diffractive surface;

positioning the first and second lenses to form a pupil between the first and second lenses and to focus infrared radiation passing through the first and second lenses; and controlling the intensity of the infrared radiation passing through the first and second lenses by positioning an aperture stop proximate the pupil;

wherein the first and second lenses together form a wide-angle lens having a view angle of about thirty degrees or greater.

19. The method of claim 18, further comprising detecting the infrared radiation passing through the first and second lenses.

20. The method of claim 19, further comprising processing the detected infrared radiation and displaying an image resulting from the processing infrared radiation.

21. The method of claim 20, further comprising adjusting the diameter of the aperture stop to modify the amount of infrared energy passing through the first and second lenses.

22. The method of claim 21, wherein adjusting step the adjustable diameter provides for stops from about F/1 to F/10.

23. The method of claim 21, wherein said adjusting step comprises automatically adjusting the diameter of the aperture stop depending upon an intensity of the infrared radiation.

24. The method of claim 21, wherein said adjusting step comprises manually adjusting the diameter of the aperture stop depending upon an intensity of the infrared radiation.

25. The method of claim 18, wherein the first and second lenses are made from a material having an index of refraction of about 2.6.

* * * * *